United States Patent
Patwardhan et al.

(10) Patent No.: US 9,489,230 B1
(45) Date of Patent: *Nov. 8, 2016

(54) HANDLING OF VIRTUAL MACHINE MIGRATION WHILE PERFORMING CLUSTERING OPERATIONS

(71) Applicant: Symantec Corporation, Mountain View, CA (US)

(72) Inventors: Manjiri R. Patwardhan, Cupertino, CA (US); Tushar A. Doshi, Santa Clara, CA (US); Pooja Sarda, Cupertino, CA (US); Anish A. Vaidya, San Jose, CA (US)

(73) Assignee: Veritas Technologies LLC, Mountain View, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/563,315

(22) Filed: Dec. 8, 2014

Related U.S. Application Data

(63) Continuation of application No. 13/493,819, filed on Jun. 11, 2012, now Pat. No. 8,910,160.

(51) Int. Cl.
*G06F 9/455* (2006.01)

(52) U.S. Cl.
CPC ... *G06F 9/45558* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 7,203,944 B1 * | 4/2007 | van Rietschote | ... | G06F 9/45533 718/1 |
| 7,716,667 B2 * | 5/2010 | van Rietschote | ... | G06F 9/45533 718/1 |
| 7,730,486 B2 * | 6/2010 | Herington | ............ | G06F 9/5077 709/223 |
| 8,135,818 B2 * | 3/2012 | Heim | .................... | G06F 9/4856 709/203 |
| 8,171,349 B2 * | 5/2012 | Stern | ................... | G06F 11/3466 714/4.1 |
| 8,239,609 B2 * | 8/2012 | Hudzia | ................. | G06F 9/5088 709/230 |
| 8,307,362 B1 * | 11/2012 | Gong | ................... | G06F 9/5077 718/1 |
| 8,370,838 B1 * | 2/2013 | Omelyanchuk | ..... | G06F 11/3644 709/201 |
| 8,468,230 B2 * | 6/2013 | Murata | ................ | G06F 9/4856 709/223 |
| 8,489,699 B2 * | 7/2013 | Goggin | ................ | G06F 9/4856 709/213 |
| 8,639,956 B2 * | 1/2014 | Hildebrand | .......... | G06F 1/3203 713/300 |
| 8,667,490 B1 * | 3/2014 | van der Goot | ..... | G06F 9/45558 711/162 |
| 8,667,500 B1 * | 3/2014 | Ji | ......................... | G06F 9/5077 718/102 |

OTHER PUBLICATIONS

Toyoshima et al. "Storage access optimization with virtual machine migration during execution of parallel data processing on a virtual machine PC cluster", 2010 IEEE, pp. 177-182.*

Wang et al. "Design and Implementation of an Efficient Load-Balancing Method for Virtual Machine Cluster Based on Cloud Service", 2011 IEEE, pp. 1-4.*

* cited by examiner

*Primary Examiner* — Van Nguyen

(74) *Attorney, Agent, or Firm* — Campbell Stephenson LLP

(57) ABSTRACT

Various systems and methods for performing clustering operations in distributed systems are disclosed. For example, one method involves performing a clustering operation that uses a virtual machine (VM). This VM is hosted by a first node. The method involves receiving an indication that indicates a migration of the virtual machine from the first node to a second node. The method also involves, in response to a receipt of this indication, suspending performance of the clustering operation using the virtual machine. The method can also involve resuming performance of the clustering operation using the virtual machine in response to receiving an indication of a successful migration of this virtual machine.

20 Claims, 13 Drawing Sheets

HANDLING OF VIRTUAL MACHINE MIGRATION WHILE PERFORMING CLUSTERING OPERATIONS

CROSS-REFERENCE TO RELATED APPLICATIONS

The present patent application is a continuation of U.S. patent application Ser. No. 13/493,819, filed on Jun. 11, 2012, which will issue as U.S. Pat. No. 8,910,160 on Dec. 9, 2014, entitled "Handling of Virtual Machine Migration While Performing Clustering Operations", and is incorporated by reference herein in its entirety and for all purposes as if completely and fully set forth herein.

BACKGROUND OF THE INVENTION

1. Field of the Invention

This application related to virtual machines. Particularly, this application relates to handling migration of virtual machines while performing clustering operation(s).

2. Description of the Related Art

A distributed system can include multiple computing nodes (nodes) that communicate with and access, using a network, data stored on a shared storage device. Each such node can implement multiple virtual machines that allow increased usage of hardware resources, i.e., by using the hardware resources of each node to support multiple virtual machines. Each virtual machine (VM) can execute a separate operating system, can be interacted with, and can be used in substantially the same manner as, a standalone operating system executing on independent hardware. Each VM can also execute one or more applications, where these applications can be accessed by various clients.

Such a distributed system can offer high availability (HA), such as by improving application availability. An HA system can switch a failed application from one node to another. Clustering software can perform various clustering operations to ensure HA operation of nodes and VMs that are hosted by such nodes. Clustering software can also perform other clustering operations on nodes and/or VMs of this distributed system.

BRIEF DESCRIPTION OF THE DRAWINGS

The embodiments of the present application may be better understood, and its numerous objects, features, and advantages made apparent to those skilled in the art by referencing the accompanying drawings.

Figure 1:
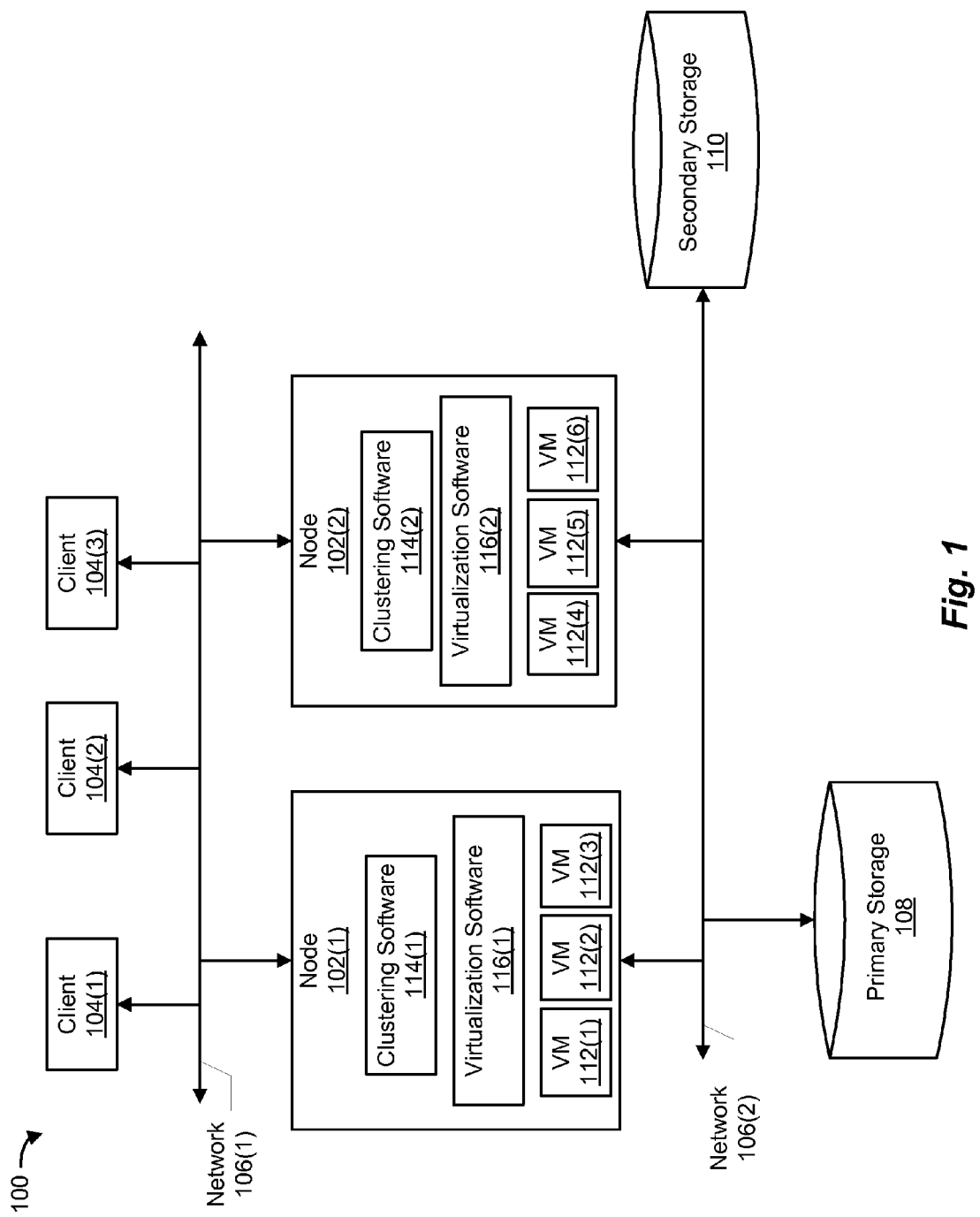
FIG. 1 is a block diagram illustrating a distributed system that implements virtual machines, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Embodiments of the present application are directed to migration of virtual machines in a distributed system. An example of such a distributed system is shown in FIG. 1. The virtual machines may be implemented by one or more nodes in this distributed system. Each virtual machine (also referred to as "VM") may, for example, provide a self-contained instance of an executing operating system. Each virtual machine may access, e.g., over a network, primary storage to perform I/O reads and writes. The primary storage can use a file system, such as virtual machine file system (VMFS), for storing data received from the virtual machines. Furthermore, the distributed system can utilize a secondary storage, such as to store backups of data stored in primary storage.

FIG. 1 is a block diagram illustrating a conventional system 100 that includes a collection of nodes and a primary and secondary storage. System 100 includes two nodes 102(1) and 102(2) that can be accessed by clients 104(1)-104(3), such as over a network 106(1). Nodes 102(1)-102(2) can access, via network 106(2), a primary storage 108 and a secondary storage 110. Although only two nodes 102(1) and 102(2) are shown, system 100 may include a different number of nodes. Each node 102(1) and 102(2) can implement one or more virtual machines 112(1)-112(6). Node 102(1) and 102(2) implement virtual machine 112(1)-112(6) using various virtualization technologies, including hypervisor technology, as discussed with reference to various other Figures, including FIGS. 8A-8C.

Nodes 102(1) and 102(2) communicate with each other via network 106(1)-106(2). Nodes 102(1) and 102(2) can also communicate with primary storage 108 and/or secondary storage 110 using network 106(1)-106(2). Each of primary storage 108 and secondary storage 110 may be a shared storage device, such as a cluster shared volume. For example, primary storage 108 may be implemented as a collection of hard disk drives aggregated to form at least one volume accessible for read and write operations by nodes 102(1) and 102(2) in distributed computing system 100.

According to some embodiments, primary storage 108 can be formatted using a virtual machine file system (VMFS), or a similar file system that can be used by multiple virtual machines. Virtual machines 112(1)-112(6) can perform I/O reads and writes to primary storage 108, such as to read and write data.

Nodes 102(1) and 102(2) can also couple via network 108 to secondary storage 110. Secondary storage 110 can be used for providing data protection and/or back-up for virtual machines 112(1)-112(6) using any one of various data protection/back-up techniques. Typically, each node 102(1) and 102(2) may be implemented using a server, including one or more processors, memory, bus, etc. One example implementation of such a server is described below with reference to FIG. 9. Network 106(1)-106(2) may be implemented as any one or more wired and/or wireless networks, including any combination of a local area network (LAN), and/or a storage area network (SAN), etc.

Each virtual machine 112(1)-112(6) can be a software implementation of a physical computer that executes computer instructions in the manner of physical computer hardware. In some embodiments, each of VMs 112(1)-112(6) is migrated from one node to another node. For example, VM 112(1) can be migrated from a source node (e.g., node 102(1)) to a target node (e.g., node 102(2)). In one or more embodiments, such a migration can be a live migration. A migration can be performed by virtualization software 116(1)-116(2), i.e., software that performs creation, destruction, and/or management of virtual machines. For example, such virtualization software can be implemented by logical partition management software ((LPAR software) or a hypervisor, among others, such as described with reference to FIGS. 8A-8C.

In some embodiments, one or more nodes 102(1)-102(2) can implement clustering software. Such clustering software can perform various clustering operations on virtual machines of a distributed system. For example, node 102(1) can include clustering software 114(1), and similarly, node 102(2) can include clustering software 114(2). Since the clustering software on both nodes 102(1) and 102(2) can communicate with each other, such as when performing operations, this software can be referred to collectively as clustering software 114. Thus, clustering software 114 can perform clustering operations on VMs 112(1)-112(6). For example, clustering software 114 can monitor virtual machines 112(1)-112(6) and/or implement high availability for virtual machines 112(1)-112(6). High availability (HA) provides various benefits for virtual machines and clients.

Clustering software 114 can provide clustering operations such as high availability (HA) for virtual machines 112(1)-112(6). Clustering software 114 can manage starting, stopping, and monitoring of virtual machines in distributed system of FIG. 1 (also referred to as a multi-node cluster). In one embodiment, each VM can also implement a clustering component (e.g., an agent, such as described with reference to FIG. 8A). This clustering component can indicate to clustering software 114 that HA is to be provided for this VM (e.g., VM 112(1)) by clustering software 114.

To avoid virtual machine corruption, clustering software 114 is configured to ensure that each VM has only one instance, e.g., is enabled on only one node. In one embodiment, to capture starting and/or stopping of each VM (i.e., that can occur outside control of clustering software 114), clustering software 114 monitors status of each VM on nodes 102(1) and 102(2).

To provide HA for virtual machines 102(1)-102(6), clustering software 114 can detect VM faults and VM concurrency issues. When clustering software 114 discovers a VM fault that can occur when a VM is down or that has faulted, clustering software 114 can restart this VM on the same node. In case of the VM fault, clustering software 114 can also fail over (e.g., switch) this failed VM to other node. When clustering software 114 discovers a VM concurrency issue, e.g., when clustering software 114 finds a VM that is up (i.e., enabled and running) on more than one node, then clustering software 114 can stop the extra VM on a target node. However, extra case should be taken when performing migration on distributed systems that implement high availability.

The methods described below illustrate various embodiments for performing clustering operations (such as HA operations) in cases where a VM is being migrated from one node to another node. In migration, especially during live migration, down time of a VM being migrated is minimized. During such migration, clustering software 114 can detect a VM fault or a VM concurrency issue for the VM being migrated. However, if clustering software 114 is registered with virtualization technology (i.e., virtualization software) for VM migration events (which can be initiated outside the control of clustering software 114), clustering software 114, upon receiving such events, can suspend operation of clustering operation(s) that use the VM being migrated. As described below, clustering software 114 can receive various indications related to VM migration, including events and/or notification of VM migration start, VM migration completion, VM migration failure, among others. One embodiment of performing VM migration while performing clustering operations is described below with reference to FIG. 2.

Figure 2:
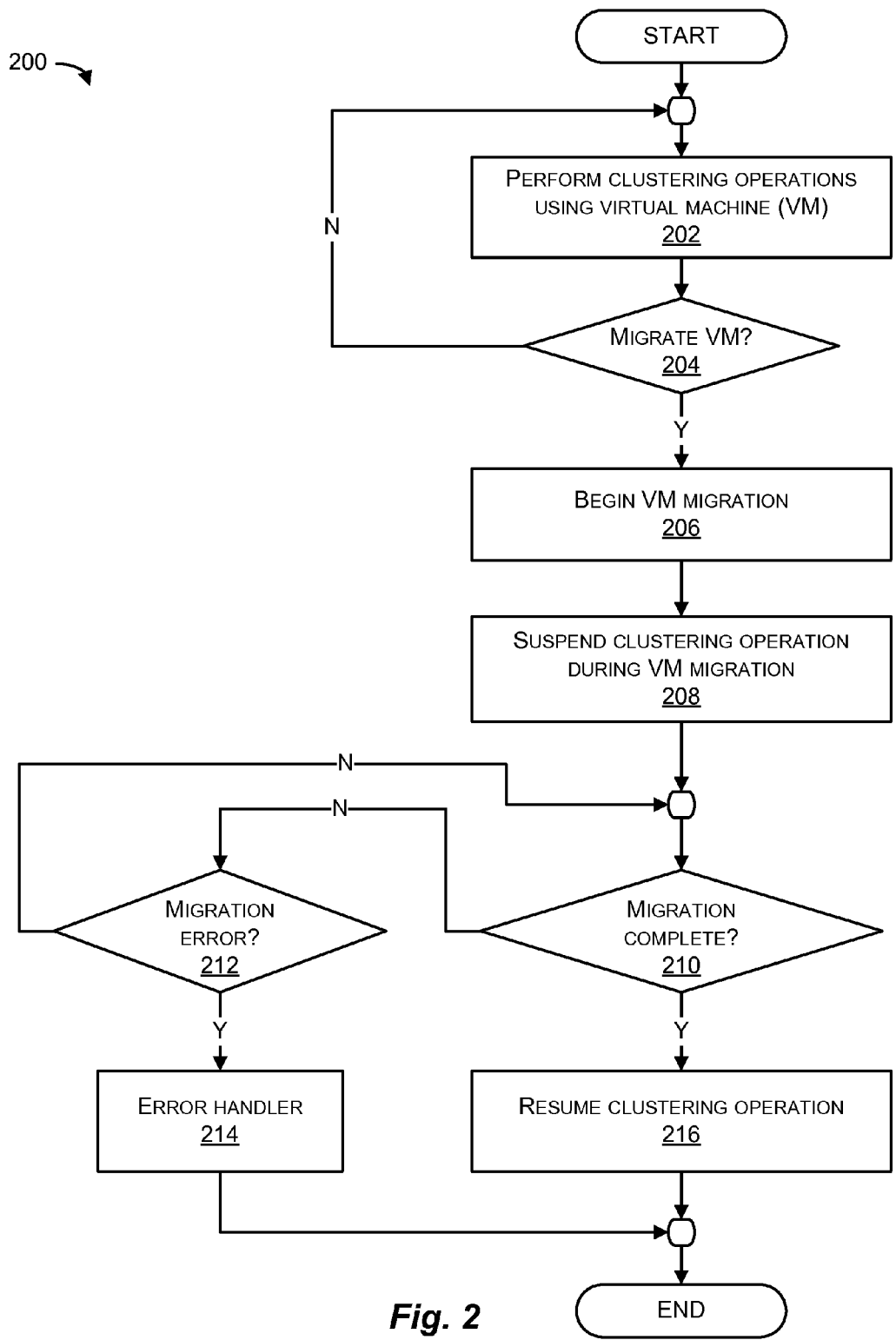
FIG. 2 is a flowchart illustrating a method for performing migration of a virtual machine while performing clustering operation(s), according to one or more embodiments.

FIG. 2 is a flowchart illustrating a method 200 for performing migration of a virtual machine while performing clustering operation(s), according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 200 is described with reference to variations of the elements described in connection with FIG. 1. In one embodiment, method 200 can be executed on node 102(1) and/or node 102(2), such as by clustering software 114.

In element 202, a clustering operation is performed using virtual machines, according to one embodiment. For example, the clustering software (e.g., clustering software 114) can perform high availability (HA) operations using virtual machines (e.g., VMs 112(1)-112(6)). Such HA operation can ensure that clients that access these VMs have continuous and reliable access to applications being executed in these VMs, as well as access to any data used by these VMs and/or stored by the primary storage.

In element 204, a determination is made as to whether to migrate one of the virtual machines, according to one embodiment. For example, virtualization software 116(1)-116(2) can determine whether VM 112(1) can be migrated from node 102(1) to node 102(2). In element 206, this migration can be started. In some embodiments, the virtual machine can be live migrated from one node to another node, where such live migration minimizes or even eliminates any downtime of the VM being migrated.

In element 208, the clustering operation (e.g., the HA operation) is suspended for the VM being migrated, according to one embodiment. However, the HA operation is continued (e.g., substantially uninterrupted) for the remaining VMs. With reference to FIG. 1, if VM 112(1) is being migrated, then the HA operation using VM 112(1) is suspended. However, the HA operation (as can be provided by clustering software 114) for the remaining VMs (i.e., VMs 112(2)-112(6)) continues.

In element 210, a determination is made whether the migration is complete, according to one embodiment. Depending on the embodiment, the virtualization software and/or clustering software can make this determination. If the migration is not complete, element 212 is performed next. In element 212, a determination is made whether there is a migration error. This determination can include determining whether the migration timed out, i.e., is taking longer than a pre-determined amount of time. If no error is determined, element 210 is performed again. If the determination indicates an error, then in element 214 an error handler is performed. The error handler can be configured to return a virtual machine to a state prior to the migration. In one embodiment, the clustering operations may also be resumed for all virtual machines (i.e., once they are returned to the pre-migration state). After the error handler is performed, method 200 ends.

Figure 3:
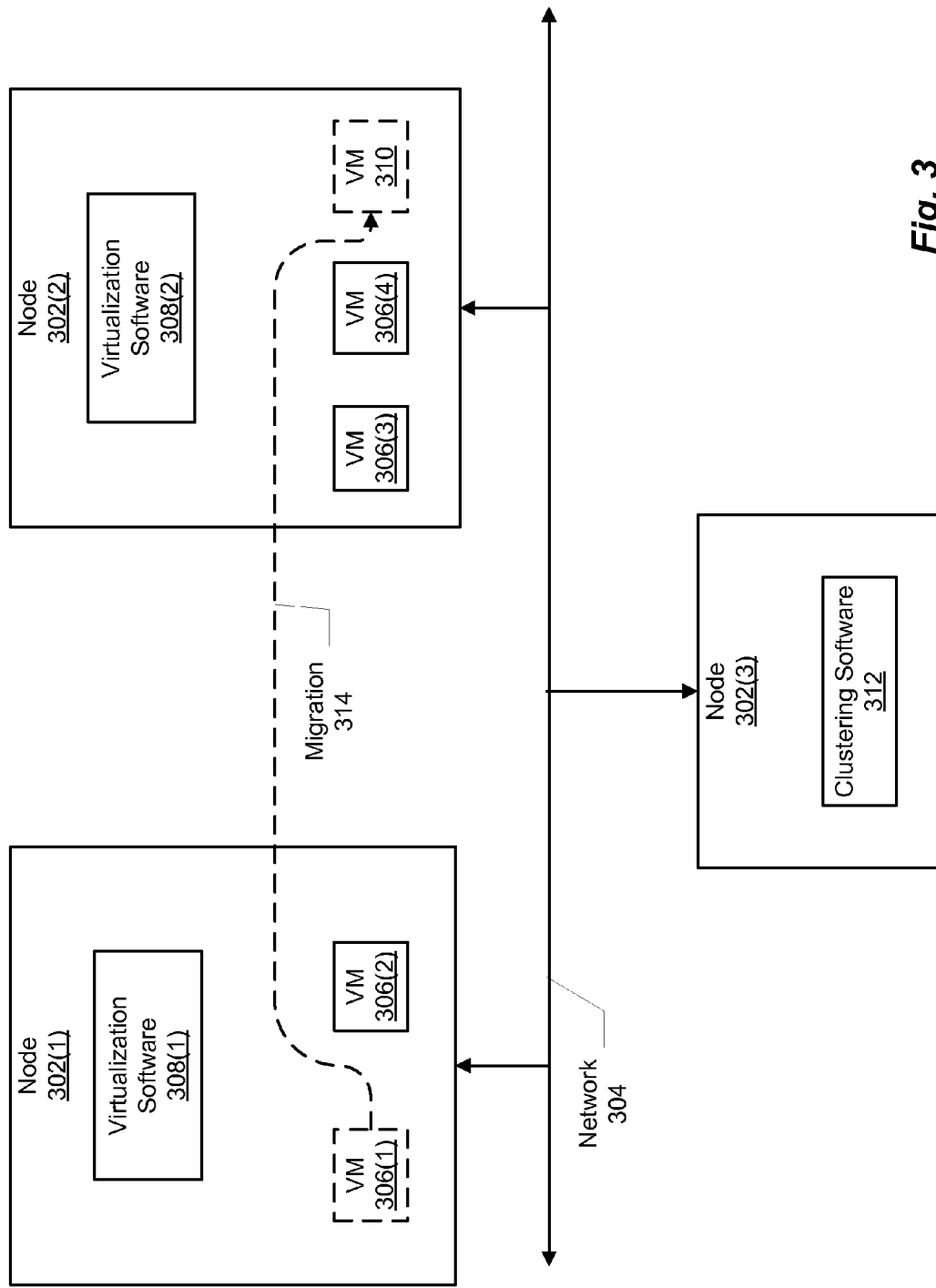
FIG. 3 is a block diagram illustrating virtual machine migration, according to some embodiments.

In element 216, the clustering operation is resumed, according to one embodiment. Element 216 is performed upon a determination that the VM migration was successful. For example, the clustering software 114 can resume the HA operation involving the virtual machine that was migrated from node 102(1) to node 102(2). FIG. 3 illustrates the migration operation in more detail.

FIG. 3 is a block diagram 300 illustrating virtual machine migration, according to some embodiments. Node 302(1) can be an implementation of node 102(1) of FIG. 1, and Node 302(2) can be an implementation of node 102(2) of FIG. 102(2). Nodes 302(1)-302(3) can communicate among each other (and the VMs) using network 304. FIG. 3 illustrates four VMs 306(1)-306(4). Virtualization software 308(1) and 308(2) (which can be implementations of virtualization software 116(1)-116(2), respectively) can manage operation of virtual machines 306(1)-306(4).

Node 302(3) includes clustering software 312, which can be an implementation of clustering software 114. As shown, clustering software 312 is executed on a separate node from nodes hosting virtual machines. It is noted, however, that the location of the clustering software is shown here for explanatory purposes only, and the clustering software can be located on another node. In some embodiments, the clustering software can be distributed one or more additional nodes in the distributed system. Clustering software 312 can perform various clustering operations on VMs 306(1)-306(4) (and on VM 310 once migration is complete and successful). As described above, a clustering operation includes High Availability (HA) operations that can be performed on nodes 302(1)-302(2) and/or VM 306(1)-306(4). Although not shown (for ease of explanation) in block diagram 300, each node can also include a host operating system; furthermore, each VM can also include a virtual machine operating system (VM OS).

In one embodiment, VM 306(1) is migrated from node 302(1) to node 302(2). In one implementation, virtualization software 308(1) and/or 308(2) can implement this migration. For illustration purposes, this migration is shown in FIG. 3 using element 314. As such, virtualization software 308(1)/308(2) can perform migration 314 of VM 306(1). As shown, during migration 314, VM 306(1) is moved from node 302(1) to node 302(2). Once migrated, VM 306(1) is activated as VM 310 on node 302(2). However, during migration 314, depending on timing of various operations performed by virtualization software 308(1)/308(2), one, both, or none of VM 306(1) and VM 310 can be present in distributed system at the same time. In order to account for migration 314, clustering software 312 suspends operation of clustering operation(s) with regard to the VM being migrated (i.e., VM 306(1)), but continues operation of these clustering operation(s) with regard to the remaining VM(s) (i.e., VM(s) not being migrated).

Depending on timing, VM 306(1) and VM 310 can be both present in the distributed system at the same time. In other words, both VM 306(1) and VM 310 can be visible by clustering software 312. This scenario may happen if VM 306(1) (that is being migrated) is not de-activated (e.g., removed) from node 302(1) before node 310 is activated (e.g., instantiated and/or started) on node 302(2). Normally, clustering software 312, upon recognizing that two instances of the same VM exist at the same time, removes one or both of these VM instances. Clustering software 312 removes such extra instances of VMs, as unless migration is being performed, such duplication of VMs can lead to various application and/or data inconsistency issues. However, once the clustering software receives an indication of this migration, the clustering software can suspend the clustering operation with regard to the virtual machine being migrated. With reference to FIG. 3, once clustering software 312 receives an indication of migration 314, clustering software 312 suspends clustering operation(s) (e.g., HA operation) using VM 306(1). However, clustering software 312 can continue the clustering operation(s) using the remaining VMs (i.e., VM 306(2)-306(4)). Once migration 314 is complete and successful, clustering software 312 can resume the clustering operation(s) using the VM that was migrated (i.e., VM 310). Operation of clustering software 312 that uses indication(s) of migration being performed is described below with reference to FIG. 4.

Figure 4:
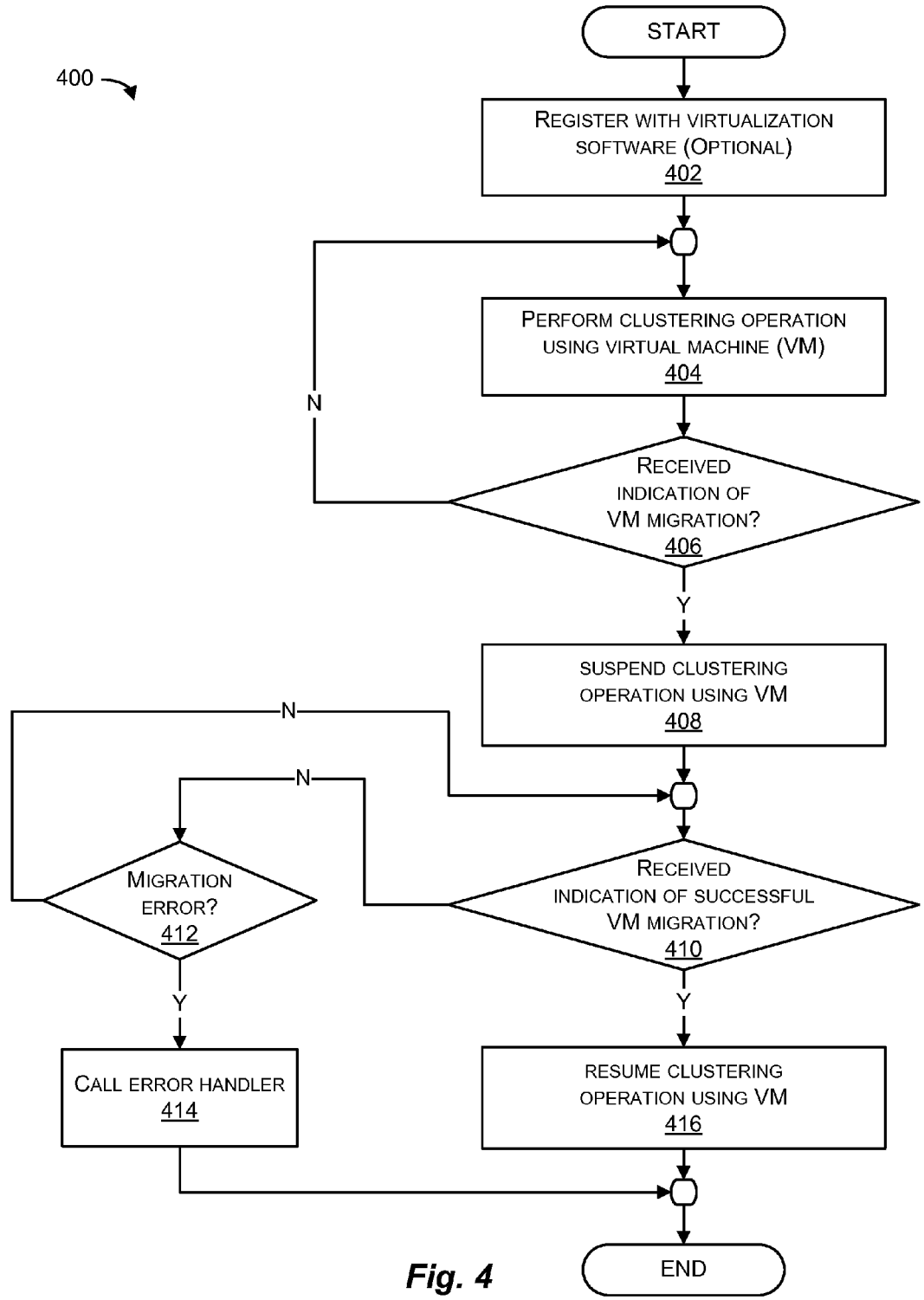
FIG. 4 is a flowchart illustrating another method for performing migration of a virtual machine while performing clustering operation(s), according to one or more embodiments.

FIG. 4 is a flowchart illustrating a method 400 for performing migration of a virtual machine while performing clustering operation(s), according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 400 is described with reference to variations of the elements described in connection with FIGS. 1 and 3. In one embodiment, method 400 can be executed by the clustering software, node 102(1), and/or node 102(2).

In element 402, an optional step of registering with the virtualization software can be performed. In one embodiment, a software component (e.g., an agent, such as described with reference to FIGS. 8A-8B) can register with the virtualization software to receive virtual machine migration events. These events can be issued by the underlying virtualization technology. In another embodiment, the software component can register with a virtual machine management console (e.g., a virtualization software component for all nodes in the distributed system) to receive notifications for start, success, and/or failure of migration of a virtual machine. In yet another embodiment, the clustering software can register with the virtualization software directly to receive these events (e.g., as described with reference to FIG. 8C).

In element 404, a clustering operation is performed using virtual machines, according to one embodiment. For example, the clustering software (e.g., clustering software 312) can perform the clustering operation, such as high availability (HA) operations, on virtual machines (e.g., VMs 306(1)-306(4)). In another example, the clustering software can monitor the virtual machines.

In element 406, a determination is made as to whether an indication of migration is received (such as by the clustering software), according to one embodiment. The clustering software (e.g., clustering software 312) can receive (and thus make this determination) such an indication from a node (e.g., node 302(1) and/or 302(2)), one of the virtual machines (e.g., VM(s) 306(1)-306(4)), and/or a software component (e.g., an agent). In one embodiment, virtualization software (e.g., virtualization software 308(1) and/or 308(2)) can send such an indication to clustering software 312. For example, the virtualization software can, upon initiating VM migration, send an indication of this migration to the clustering software. The source of such an indication can depend on the embodiment(s) and/or the type of virtualization software being used by the nodes in the distributed system.

In element 408, if a determination is made that the indication of VM migration is received, the clustering operation using the VM being migrated is suspended. For example, the clustering software (e.g., clustering software 312) suspends operation of the clustering operation (e.g., HA operation) that uses VM 306(1) (and/or VM 310) as the VM being migrated. In one embodiment, the clustering software can also suspend monitoring of the VM being migrated. However, the clustering software continues (e.g., substantially uninterrupted) the clustering operation(s) on the remaining VMs. With reference to FIG. 1, if VM 112(1) is being migrated, then clustering software 114 suspends the clustering operation(s) on VM 112(1). However, clustering software 114 continues the clustering operation(s) on the remaining VMs (i.e., VMs 112(2)-112(6)). If the clustering software does not receive an indication of VM migration, the clustering software continues performing the clustering operation(s).

In element 410, a determination is made as to whether an indication of successful VM migration is received (such as by the clustering software), according to one embodiment. The clustering software can receive (and thus make this determination) such an indication from virtualization software, a node, one of the VMs, and/or a software component. The source of this indication can depend on the embodiment(s) and/or the type of virtualization software (e.g., LPAR, hypervisor, etc.) being used by the nodes in the distributed system. This indication can indicate that VM 306(1) is successfully migrated from node 302(1) to node 302(2). In one embodiment, this indication can indicate that VM 306(1) is no longer hosted by node 302(1), and instead this migrated VM is hosted, as VM 310, by node 302(2).

If no such indication of successful migration is received, element 412 is performed next. In element 412, a determination is made whether there is a migration error. The clustering software can determine if there's a migration error, such as whether the migration timed out, i.e., when this migration is taking longer than a pre-determined amount of time. If no error is detected, element 410 is performed again. If the determination indicates an error, then in element 414, an error handler is called (e.g., by the clustering software). Performance of the error handler may include returning state of the virtual machines to where they were before the migration started. In one embodiment, the clustering operation(s) may also be resumed for all virtual machines (i.e., once they are returned to the pre-migration state). After the error handler is performed, method 400 ends.

In element 416, the clustering operation(s) is resumed, according to one embodiment. Element 416 is performed upon a determination that the VM migration was successful. For example, the clustering operation(s) involving the virtual machine that was migrated is resumed. With reference to FIG. 3, the clustering operation (e.g., monitoring and/or HA operation) is resumed using VM 310. VM 310 can be referred to as the migrated instance of VM 306(1).

Figure 5:
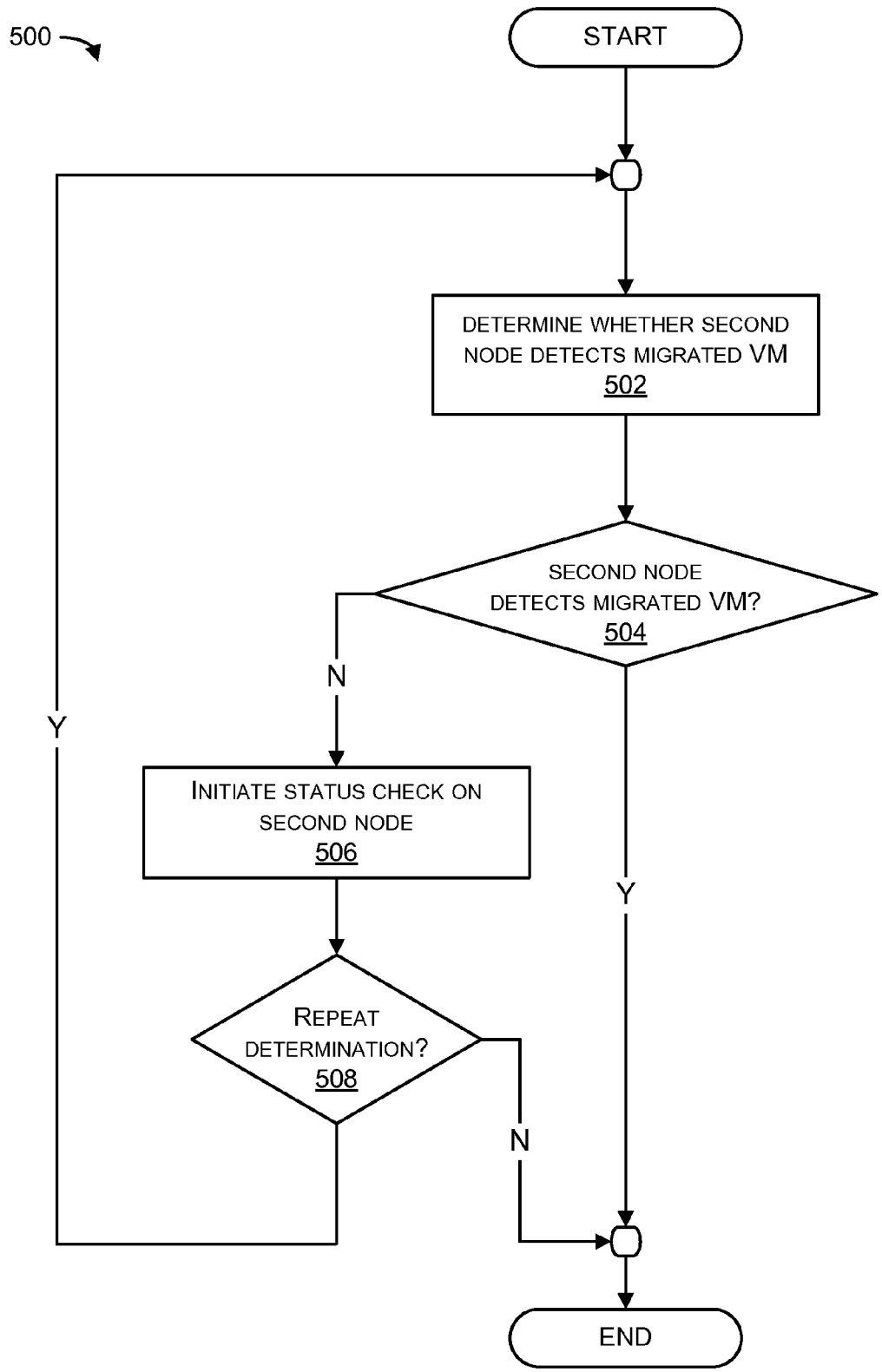
FIG. 5 is a flowchart illustrating additional and/or alternate elements of a method for performing migration of a virtual machine while performing clustering operation(s), according to one or more embodiments.

FIG. 5 is a flowchart of a method for additional and/or alternate elements of flowcharts 200 and/or 400, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 500 is described with reference to variations of the elements described in connection with FIGS. 1 and 3. In one embodiment, method 500 can be executed by the clustering software, node 102(1), and/or node 102(2).

In element 502, it is determined whether second node detects a migrated VM. For example, the clustering software (e.g., clustering software 312) can determine whether the target node (e.g., node 302(2)) detects that VM 310 has been successfully migrated from the source node (e.g., node 302(1)). This situation can arise when, for example, a software component (e.g., an agent) on node 302(2) sends an indication of a successful migration of the virtual machine (e.g., that VM 310 is successfully migrated and being hosted by node 302(2)). In one example, for one reason or another, node 302(2) (i.e., virtualization software 308(2) of node 302(2)) has not yet acknowledged this successful migration.

In element 504, if the second node does not detect that the VM is successfully migrated, then element 506 is performed. For example, the clustering software can determine that the virtualization software of the target node (e.g., virtualization software 308(2)) has not yet detected a successful migration of the virtual machine (e.g., VM 310) that is being hosted by that node. In element 506, the clustering software can then initiate a status check to be performed by that virtualization software on the target node. This status check operates to determine what VMs are being hosted by the respective node. In element 508, it is determined whether the determination of element 504 is to be repeated. For example, the clustering software can make this determination. If the clustering software determines that element 504 should be performed again, element 502 is executed next. Otherwise, method 500 ends.

Figure 6:
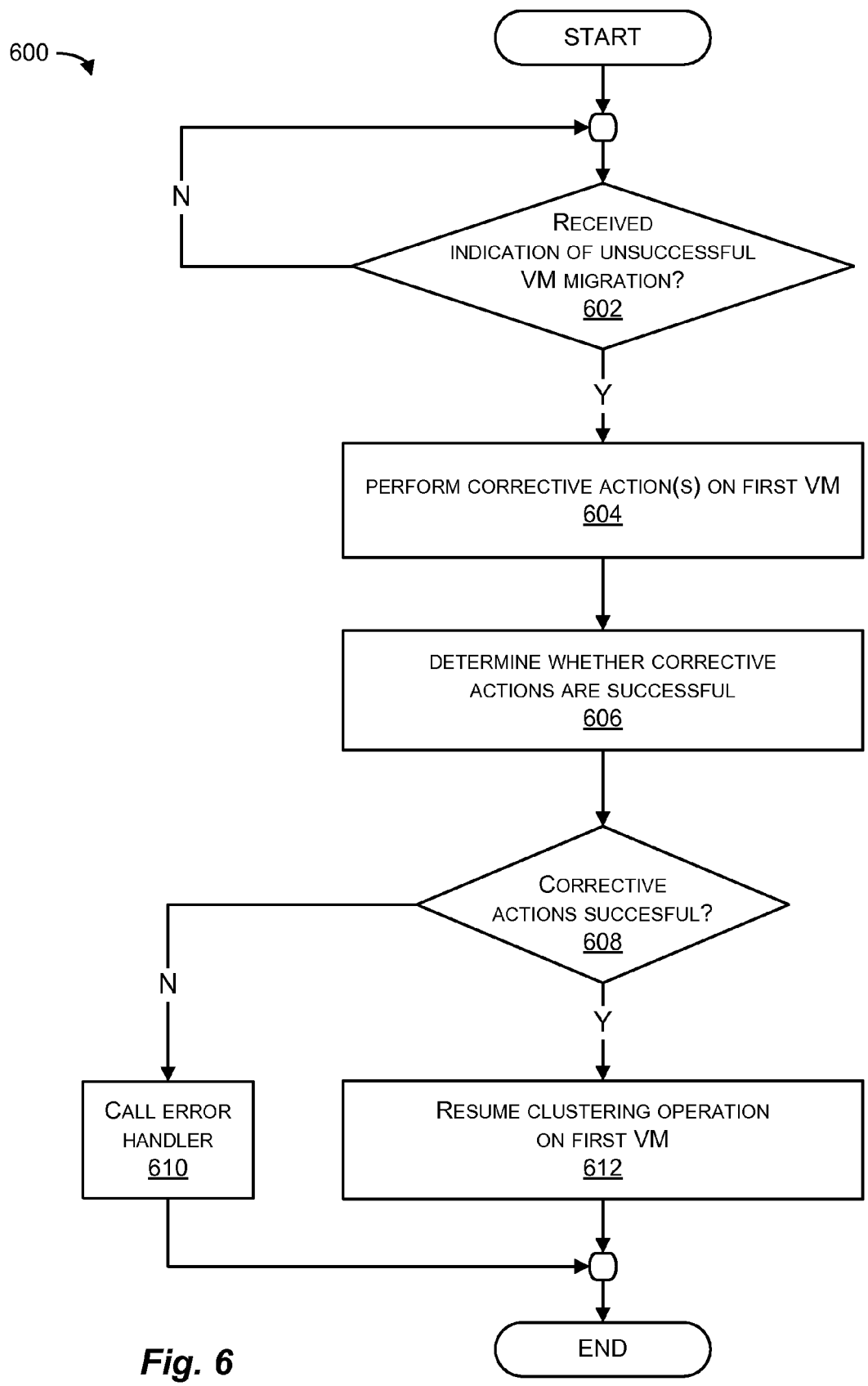
FIG. 6 is a flowchart illustrating additional and/or alternate elements of a method for performing migration of a virtual machine while performing clustering operation(s), according to one or more embodiments.

FIG. 6 is a flowchart of a method for additional and/or alternate elements of flowcharts 200 and/or 400, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 600 is described with reference to variations of the elements described in connection with FIGS. 1 and 3. In one embodiment, method 600 can be executed by the clustering software, node 102(1), and/or node 102(2).

In some embodiments, the process depicted in FIG. 6 includes one or more of element(s) 212-216 of FIG. 2 and/or one or more of element(s) 412-416 of FIG. 4. In one embodiment, method 600 is executed when element 210 determines that migration is not complete. As such, method 600 performs elements 212 and 214 of method 200. In another embodiment, method 600 is executed when element 410 determines that no indication of successful migration is received. As such, method 600 performs elements 412 and 414 of method 400.

In element 602, it is determined whether an indication of unsuccessful VM migration is received. In one embodiment, the clustering software (e.g., clustering software 312) can receive this indication. The clustering software can receive such an indication from a node (e.g., node 302(1) and/or 302(2)), one of the virtual machines (e.g., VM(s) 306(1)-306(4)), and/or a software component (e.g., an agent). In one embodiment, virtualization software (e.g., virtualization software 308(1) and/or 308(2)) can send such an indication to clustering software 312. For example, the virtualization software can, upon noticing a failure of the VM migration, send an indication of this migration failure to the clustering software. The source of this indication can depend on the embodiment(s) and/or the type of virtualization software being used by the nodes in the distributed system. Examples of such notification system(s) are described below with reference to FIGS. 7 and/or 8A-8C.

In element 604, corrective action(s) can be performed on the virtual machine being migrated. For example, depending on the condition of the VM being migrated, the clustering software can perform one or more corrective actions on the virtual machine on the source (i.e., first) and/or the target (i.e., second) node. The corrective action(s) can include deleting the virtual machine on the target node (e.g., if the VM, e.g., VM 310, is improperly migrated). The corrective action(s) can include re-activating the virtual machine (that was being migrated) on the source node, e.g., re-activating VM 306(1) on node 302(1). In yet another embodiment, the corrective action can include correcting the migration of the virtual machine to the target node. In this embodiment, the clustering software can, for example, communicate with the virtualization software to successfully complete the migration of the virtual machine.

In element 606, it is determined whether the corrective actions were successful. For example, the clustering software can determine whether the action(s) performed in element 606 were successful. In element 608, if the corrective actions are successful, then element 612 is performed next. Otherwise, element 610 is performed. For example, the clustering software can make this determination, and then initiate execution of either an error handler (i.e., element 610), or resume (element 612) the clustering operation on the VM that was being migrated.

Figure 7:
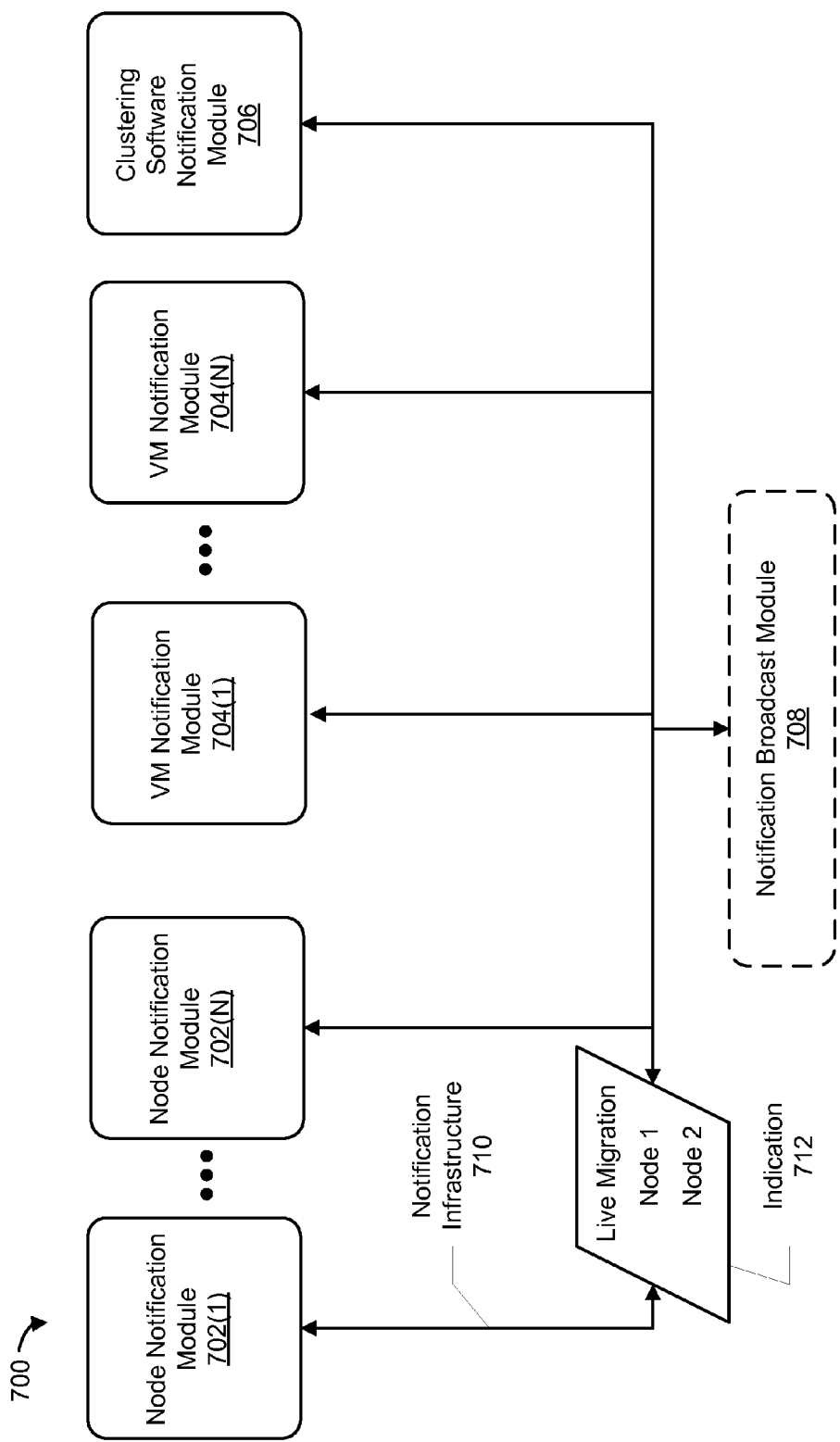
FIG. 7 is a block diagram of a notification system as implemented by a distributed system, according to one or more embodiments.

FIG. 7 is a block diagram illustrating a notification system 700 that includes a notification infrastructure and notification modules, according to one embodiment. The notification system can be used to communicate indications, notifications, and/or responses between VMs, nodes, agents, and/or various module(s). The notification system includes node notification modules 702(1)-702(N), Virtual Machine (VM) notification modules 704(1)-704(N), clustering software notification module 706, an optional notification broadcast module 708, and a notification infrastructure 710.

Node notification modules 702 (i.e., node notification modules 702(1)-702(N)) are associated with nodes, such as nodes 102(1)-102(2). VM notification modules 704 (i.e., VM notification modules 704(1)-704(N)) are associated with virtual machines, such as VMs 112(1)-112(6). Notification infrastructure 710 facilitates sending and receiving of indications, notifications, and/or responses between notification modules 702 and 704. In one embodiment, notification module(s) 702, 704, and/or 706 can send indication(s) (e.g., indication 712) that indicates one or more events. In one embodiment, the clustering software, that includes clustering notification module 706, can suspend performance of clustering operation(s) upon clustering notification module's 706 receipt of such a notification (i.e., as described in element 408 of FIG. 4).

In one embodiment, on receiving an event (e.g., a migration start notification), a VM notification module 704(1) can send indication messages containing information about this event to clustering software notification module 706 (e.g., on a node where the VM is currently up and running) Upon receiving this message, clustering software notification module 706 on that node broadcasts this message to all nodes 702(1)-702(2) in the distributed system. As a result, clustering software on all nodes is made aware of a start of migration of a particular VM.

Events can include start of a migration (e.g., a live migration) of a virtual machine, for example, such as migration of a virtual machine from a source node to a target node. In this case, node notification module 702(1) (such that is associated with node 302(1)) can send indication 712, indicating start of migration of VM 306(1), to other node notification modules. In one embodiment, another node notification module (such that is associated with node 302(2)) can send another indication indicating that VM 310 is being migrated to node 302(2). However, in one embodiment, indication 712 can indicate both the source node (node 302(1)) and the target node (node 302(2)) of this migration. Other events include migration success (e.g., VM 310 successfully migrated to node 302(2)) and migration failure (e.g., VM 310 unsuccessfully migrated to node 302(2)), among others.

For example, start of VM migration can be detected by an agent (e.g., an agent executing on the node associated with node notification module 702(1)). As a result of this migration being detected, node notification module 702(1) associated with this node can send an indication informing recipient(s) of this change. In some embodiments, the nodes are monitored for changes. In one embodiment, agent(s) can include and/or implement a node notification and/or cluster notification module(s). In some embodiments, VM notification modules can send such indications instead, i.e., without using node notification modules.

Notification broadcast module 708 is optional, and may be used in some embodiments. For example, notification module 702(1) can send indication 712 to notification broadcast module 708. Notification broadcast module 708, in response to receiving such indication 712 from notification module 702, can sent additional indications (e.g., that are substantially similar to indication 712) to other notification modules 702 and/or 704. Notification modules 702 and/or 704, upon receiving this notification, can communicate (an indication, e.g., that of this event) to agent(s) and/or administrator module(s). The agent(s) and/or administrator module(s), upon receiving this indication, can perform a certain action, as described with reference to other Figures.

Figure 8A:
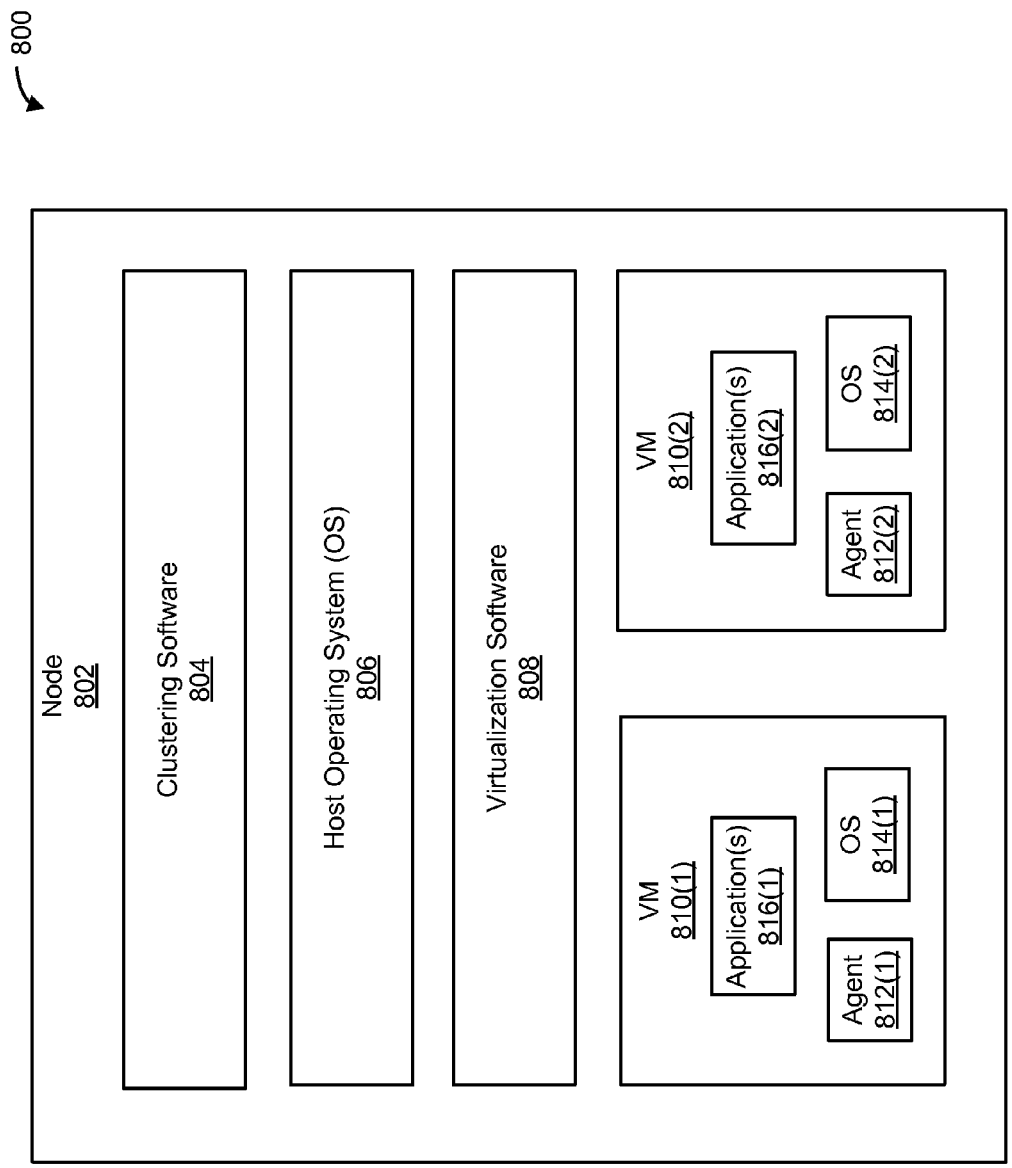
FIGS. 8A-8C are block diagrams of various nodes that implement various virtualization technologies, according to one or more embodiments.
Figure 8B:
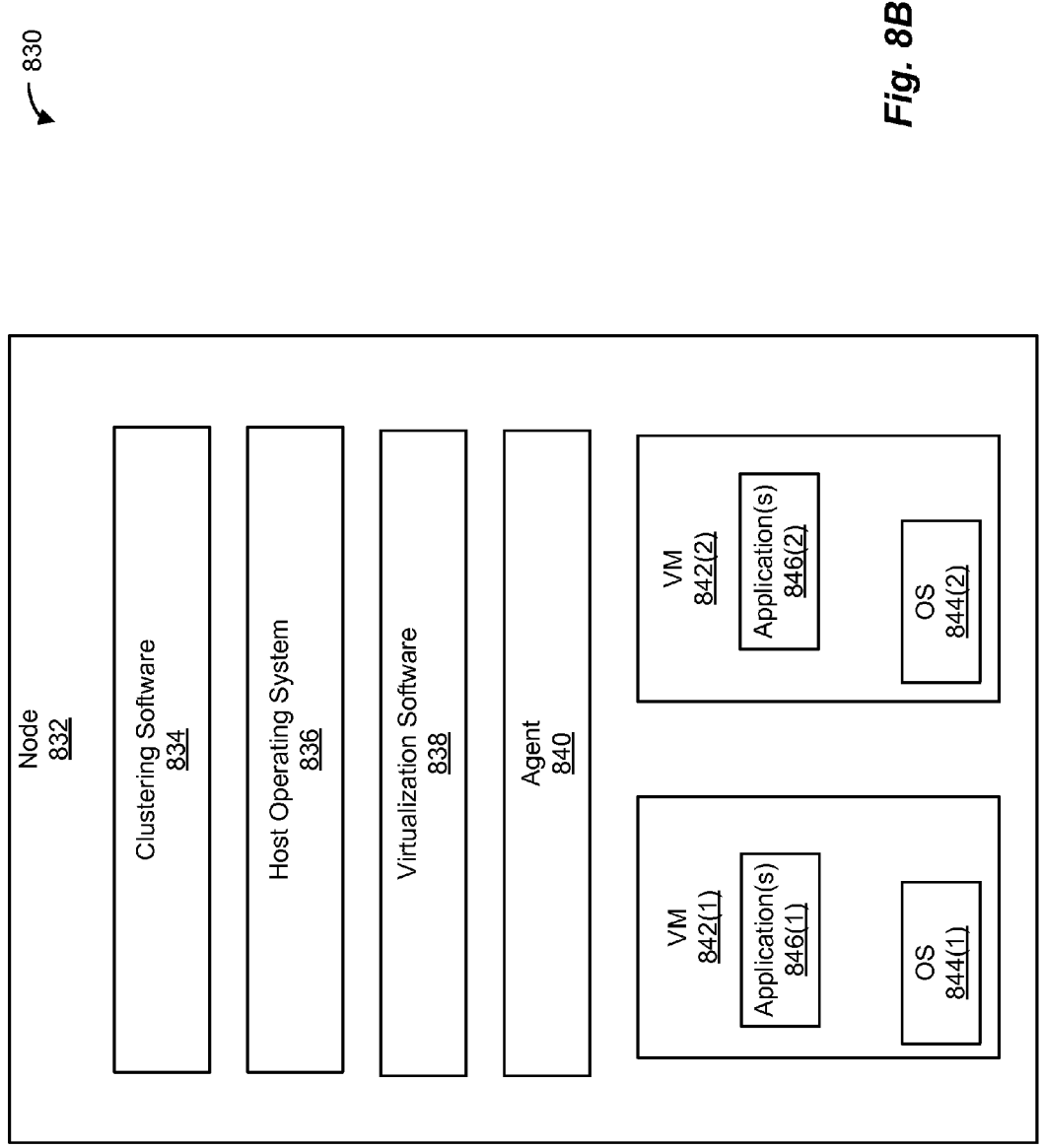
Figure 8C:
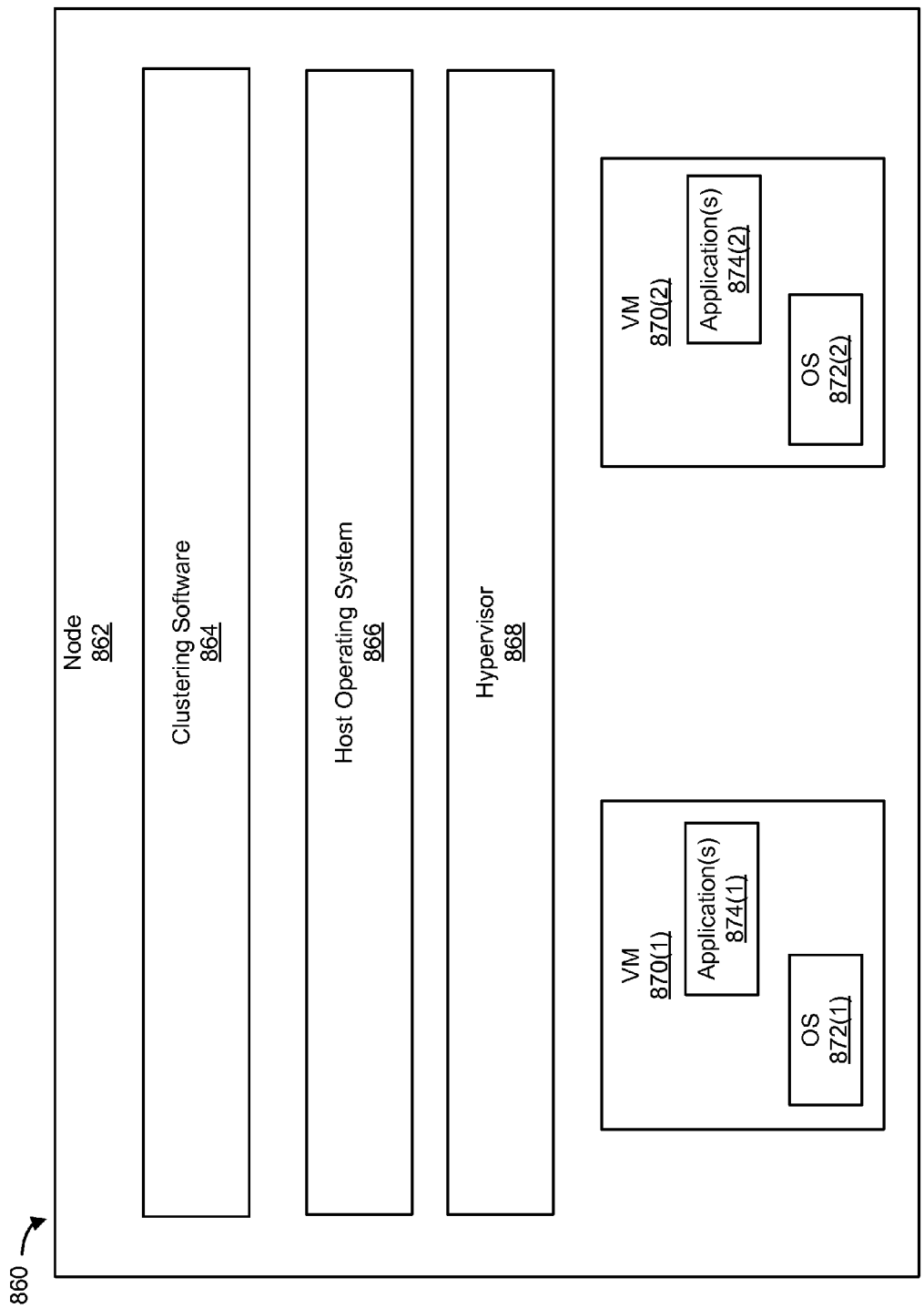

FIGS. 8A-8C are block diagrams of various nodes 802, 832, and 862 that implement various virtualization technologies, according to one or more embodiments. Nodes 802, 832, and 862 may be example implementations of any of nodes 102(1), 102(2), 302(1), and/or 302(2), according to some embodiments. Each such node can host one or more virtual machines (VMs). Each such VM can be implemented using the same or different operating systems. A client interacting with a VM will typically interact in substantially the same manner that a client would interact with a stand-alone operating system operating on independent hardware. In other words, each virtual machine may operate as if a host computer (e.g., a node hosting this VM) were under that virtual machine's control, but actually share the host computer system's resources.

FIG. 8A is a block diagram 800 of a node 802 that includes clustering software 804, a host operating system 806, virtualization software 808, and virtual machines 810(1)-810(3). It is noted that is some embodiments, one or more of these elements may be combined. For example, host operating system 806 and virtualization software 808 may be implemented as one software and/or hardware module. In one embodiment, clustering software can be implemented outside of node 802. It is also noted that in some embodiments one or more of elements of node 802 may not be used.

Host operating system 806 is an operating system that enables execution of virtualization software 808. Virtualization software 808 (such as LPAR management software) can be implemented in software and/or hardware, and may provide node 802 the ability to concurrently support multiple LPARs, also referred to as virtual machines, 810(1)-810(2). Virtualization software 808 may provide such ability by coordinating the distribution of computer resources (e.g., processing power, memory, etc.) among virtual machines 810(1)-810(2), so that virtual machines 810(1)-810(2) operate similarly to physical computers. Virtual machines 810(1)-810(2) may be implemented in software (i.e., of node 802) and execute computer instructions similarly to physical hardware. Virtualization software 808 may act as a coordinator or manager of computing resources (e.g., such as processor(s), memory, etc.) of node 802. Virtualization software 808 can support multiple virtual machines 810(1)-810(2) by coordinating processor resources to support the execution of instructions on behalf of various virtual machines 810(1)-810(2), and performing memory management to help ensure that the virtual machines effectively share node's 802 system memory.

For example, such LPAR management software can be used to implement multiple logical partitions (LPARs) 810(1)-810(2), where each such LPAR is referred to as a VM. In one embodiment, one or more of these VMs 810(1)-810(2) can also implement an agent 812(1)-812(2), respectively. Each VM can also include an operating system 814(1)-814(2) and one or more applications 816(1)-816(2), respectively. An example of such application 816(1) can be a database program, where one or more clients (e.g., client(s) 104(1)-104(3)) can access this application.

During migration, the virtual machine (e.g., VM 810(1)) is migrated from one node (e.g., node 802) to another node. During such migration, any application(s) executing on that VM are also migrated, preferably without changing any state of these application(s). In one embodiment, during migration, such as during live migration, VM 810(1) is moved from node 802 to another node without disconnecting the client(s) or application 816(1). In one embodiment, virtualization software 808 can initiate this migration, such as in response to a system administrator requesting migration.

Once virtualization software 808 initiates migration of VM 810(1), VM OS 814(1) can communicate with agent 812(1) regarding this migration. In one embodiment, VM OS 814(1) can assert one or more interrupts, where each interrupt indicates an event, i.e., a migration start in this case. In another embodiment, VM OS 814(1) can send a notification of an event, to agent 812(1), i.e., indicating migration start in this case. In other embodiments, agent 812(1) can poll OS 814(1) for whether a VM migration (or another event) has occurred. In one embodiment, agent 812(1) includes a VM notification module (such as VM notification module 704(1)) that can send indication(s) to other notification modules (including clustering software notification module 706).

FIG. 8B is a block diagram 830 of a node 832 that includes clustering software 834, a host operating system 836, virtualization software 838, an agent 840, and virtual machines 842(1)-842(3). It is noted that is some embodiments, one or more of these elements may be combined. For example, host operating system 836 and virtualization software 838 may be implemented as one software and/or hardware module. In one embodiment, clustering software can be implemented outside of node 832. It is also noted that in some embodiments one or more of elements of node 832 may not be used.

Host operating system 836 is an operating system that enables execution of virtualization software 838. Virtualization software 838 (such as LPAR or a hypervisor) can be implemented in software and/or hardware, and may provide node 802 the ability to concurrently support multiple VMs 842(1)-842(2). Virtualization software 838 may provide such ability by coordinating the distribution of computer resources (e.g., processing power, memory, etc.) among virtual machines 842(1)-842(2), so that virtual machines 842(1)-842(2) operate similarly to physical computers. Virtual machines 842(1)-842(2) may be implemented in software (i.e., of node 832) and execute computer instructions similarly to physical hardware. Virtualization software 838 may act as a coordinator or manager of computing resources (e.g., such as processor(s), memory, etc.) of node 832. Virtualization software 838 can support multiple virtual machines 842(1)-842(2) by coordinating processor resources to support the execution of instructions on behalf of various virtual machines 842(1)-842(2), and performing memory management to help ensure that the virtual machines effectively share node's 832 system memory. Each VM can also include an operating system 844(1)-844(2) and one or more applications 846(1)-846(2). An example of such application 846(1) can be a database program, where one or more clients (e.g., client(s) 104(1)-104(3)) can access this application.

During migration, the virtual machine (e.g., VM 842(1)) is migrated from one node (e.g., node 832) to another node. During such migration, any application(s) executing on that VM are also migrated, preferably without changing any state of these application(s). In one embodiment, during migration, such as during live migration, VM 842(1) is moved from node 832 to another node without disconnecting the client(s) or application 846(1). In one embodiment, virtualization software 838 can initiate this migration, such as in response to a system administrator requesting migration. In one embodiment, agent 840 can receive event (of this VM migration) from virtualization software 838.

In some embodiments, once virtualization software 838 initiates migration of VM 842(1), VM OS 844 can communicate with agent 840 regarding this migration. In another embodiment, VM OS 844 can communicate with host operating system 836 regarding this migration. Host operating system 836 can then assert one or more interrupts, where each interrupt indicates an event, i.e., a migration start in this case. In another embodiment, host operating system 836 can send a notification of an event, to agent 840, i.e., indicating migration start in this case. In other embodiments, agent 840 can poll host operating system 836 for whether a VM migration (or another event) has occurred on any VMs that are hosted by node 832. In one embodiment, agent 840 includes a node notification module (such as node notification module 702(1)) that can send indication(s) to other notification modules (including clustering software notification module 706).

FIG. 8C is a block diagram 860 of a node 862 that includes clustering software 864, a host operating system 866, a hypervisor 868, and virtual machines 870(1)-870(3). It is noted that is some embodiments, one or more of these elements may be combined. For example, host operating system 866 and hypervisor 868 may be implemented as one software and/or hardware module. In one embodiment, clustering software can be implemented outside of node 862. It is also noted that in some embodiments one or more of elements of node 802 may not be used.

Host operating system 866 is an operating system that enables execution of hypervisor 868 (or another type of virtualization software). Hypervisor 866 can be implemented in software and/or hardware, and may provide node 862 the ability to concurrently support virtual machines 870(1)-870(3). Hypervisor 868 may provide such ability by coordinating the distribution of computer resources (e.g., processing power, memory, etc.) among virtual machines 870(1)-870(3), so that virtual machines 870(1)-870(3) operate similarly to physical computers. Virtual machines 870(1)-870(3) may be implemented in software (i.e., of node 862) and execute computer instructions similarly to physical hardware. Hypervisor 868 may act as a coordinator or manager of computing resources (e.g., such as processor(s), memory, etc.) of node 862. Hypervisor 868 supports multiple virtual machines 870(1)-870(3) by coordinating processor resources to support the execution of instructions on behalf of various virtual machines 870(1)-870(3), and performing memory management to help ensure that the virtual machines effectively share node's 862 system memory, for example.

During migration, the virtual machine (e.g., VM 870(1)) is migrated from one node (e.g., node 862) to another node. During such migration, any application(s) executing on that VM are also migrated, preferably without changing any state of these application(s). In one embodiment, during migration, such as during live migration, VM 870(1) is moved from node 862 to another node without disconnecting the client(s) or application 874(1). In one embodiment, hypervisor 868 can initiate this migration, such as in response to a system administrator requesting migration.

Once hypervisor 868 (or another type of virtualization software) initiates migration of VM 870(1), in one embodiment, hypervisor 868 can communicate with clustering software 864 regarding this migration. In one embodiment, hypervisor 868 can send a notification of an event, to clustering software 864, i.e., indicating migration start in this case. In other embodiments, clustering software 864 can poll hypervisor 868 as to whether a VM migration (or another event) has occurred on any VMs that are hosted by node 862. In one embodiment, clustering software 864 includes a node notification module (such as clustering software notification module 706) that can send indication(s) to other notification modules.

Figure 9:
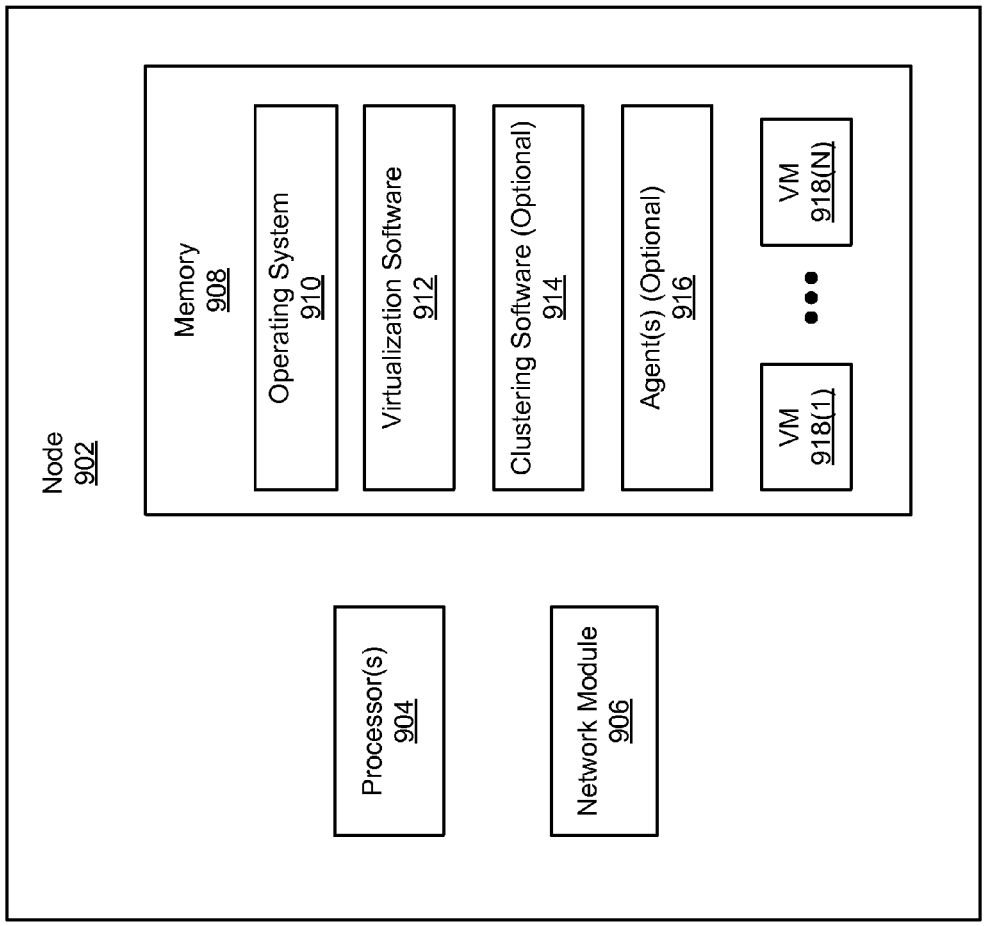
FIG. 9 is a block diagram illustrating various components of a node of a distributed system, according to one embodiment.

FIG. 9 is a block diagram 900 of a node 902, such as node 102(1)-102(2), 302(1)-302(3), 802, 832, and/or 862. Node 902 includes a processor 904, network module 906, and a memory 908. Memory 908 includes an operating system 910, virtualization software 912, optional clustering software 914, optional agent(s) 916, and one or more virtual machines 918(1)-918(N). It is noted that is some embodiments, one or more of these elements may be combined. It is also noted that one or more of elements 912-916 may be implemented as a software and/or hardware module. It is also noted that in some embodiments one or more of elements of node 902 may not be used. Processor(s) 904 can execute one or more of elements 910-916, as well as VMs 918(1)-918(N). One or more of modules 910-916 can implement at least portions of methods 200, 400, 500, and/or 600.

Figure 10:
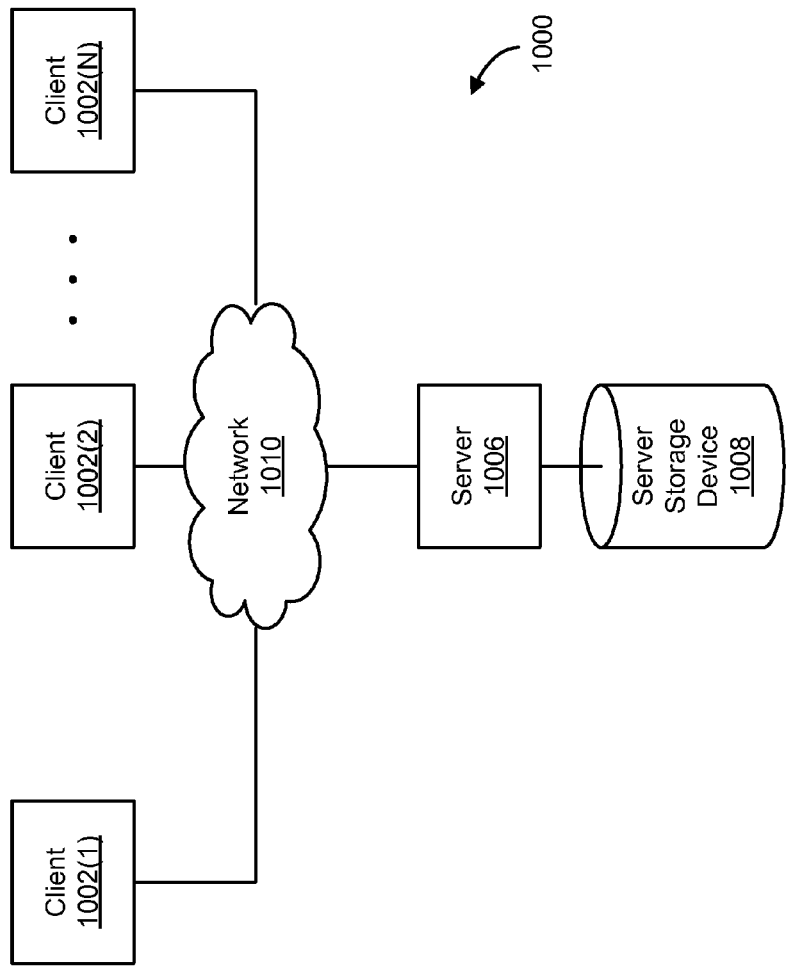
FIG. 10 is a block diagram illustrating a network architecture in which embodiments of the present application can be implemented.

Elements of network architecture can be implemented using different computer systems and networks. An example of one such network environment is described below with reference to FIG. 10. FIG. 10 is a simplified block diagram illustrating a network architecture 1000 in which one or more clients are provided with access to a server via various network connections. As depicted in FIG. 10, clients 1002(1)-(N) are coupled to a network 1010, and so are able to access a server 1006 (which can be used to implement node(s) of FIGS. 1, 3, and/or 8A-8C) via network 1010. Other servers (not shown) can be used instead to implement node(s) of FIGS. 1, 3, and/or 8A-8C). A client can be implemented using, for example, a desktop computer, a laptop computer, a workstation, a server, a cell phone, a smart phone, a network-enabled personal digital assistant (PDA), or the like. An example of network 1010, which can be used by clients 1002(1)-(N) to access server 1006, is the Internet. Alternatively, access to server 1006 can be provided by a local area network (LAN) utilizing Ethernet, IEEE 802.11x, or some other communications protocol. As will be appreciated, server 1006 can be accessed by clients coupled directly thereto (not shown).

As also depicted on FIG. 10, server 1006 is coupled to a server storage device 1008, which includes a data volume such as storage 108/110, among others. Server storage device 1008 can be implemented as a single storage device or a collection of storage devices. Server storage device 1008 can also be implemented as a storage area network, which couples remote storage devices to a server (e.g., server 1006), such that the remote storage devices appear as locally-attached storage devices to the server's OS, for example.

In light of the present disclosure, those of skill in the art will appreciate that server storage device 1008 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 1000 can include other components such as routers, firewalls and the like that are not germane to the discussion of the present network and will not be discussed further herein. Those of skill in the art will also appreciate that other configurations are possible. For example, clients 1002(1)-(N) can be directly coupled to server storage device 1008 without the user of a server or Internet; server 1006 can be used to implement both the clients and the server; network architecture 1000 can be implemented without the use of clients 1002(1)-(N); and so on.

As an example implementation of network architecture 1000, server 1006, services requests to data generated by clients 1002(1)-(N) to data stored in server storage device 1008. Any of the functionality of the nodes, agents, and/or administration modules can be implemented using one of the node(s) of FIGS. 1, 3, and/or 8A-8C.

Figure 11:
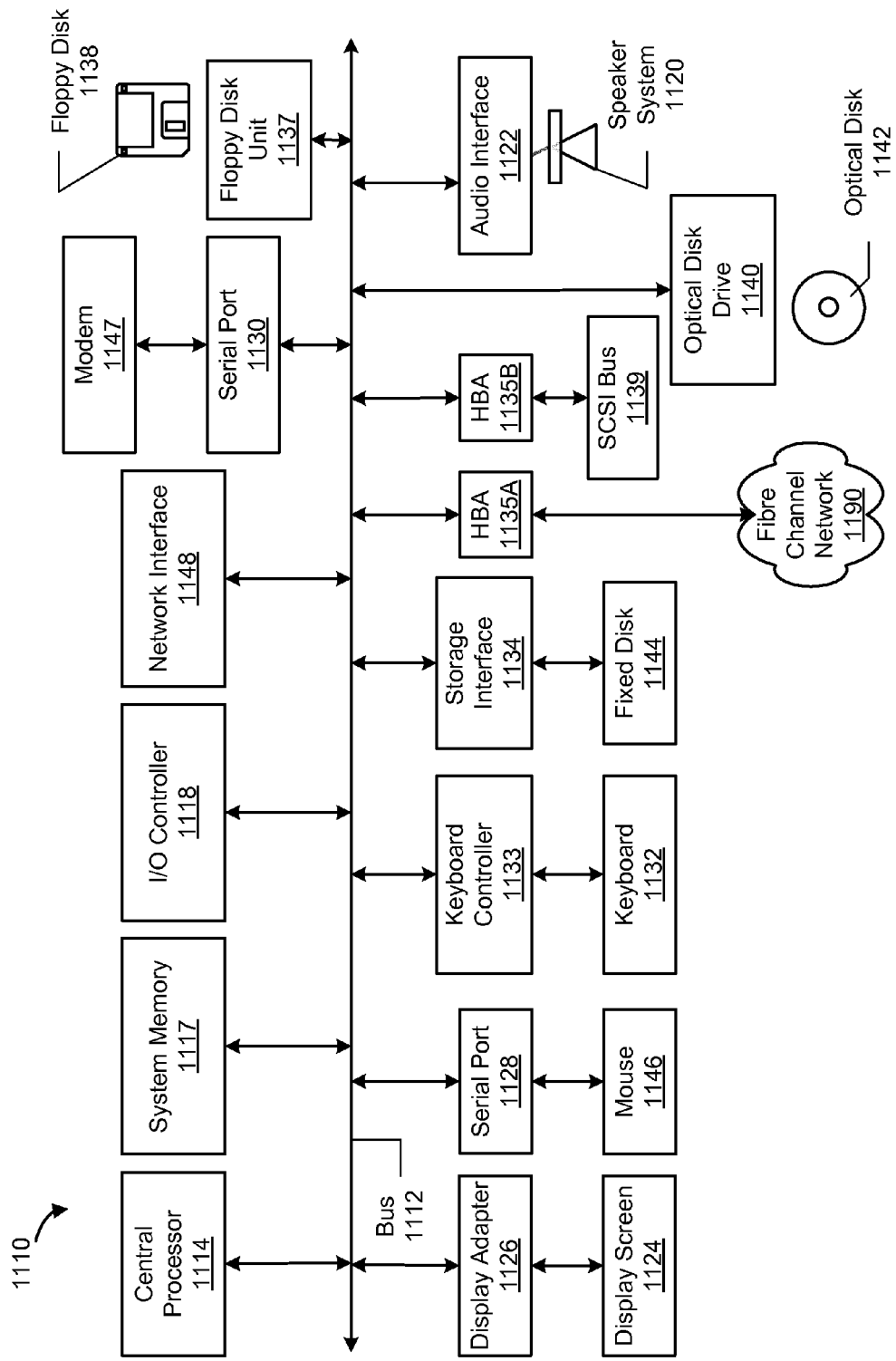
FIG. 11 is a block diagram that illustrates an example of a computer system suitable for implementing embodiments of the present application.

FIG. 11 depicts a block diagram of a computer system 1110 suitable for implementing the present disclosure. Computer system 1110 may be illustrative of various computer systems in the networked system of FIG. 1, such as node(s) and/or coordinator node(s), among others. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fibre Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), a floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present disclosure. The devices and subsystems can be interconnected in different ways from that shown in FIG. 11. The operation of a computer system such as that shown in FIG. 11 is readily known in the art and is not discussed in detail in this application. Code for handling of VM migration while performing clustering operations (such as described above with reference to the methods of FIGS. 2, 4, 5, and/or 6), etc., to implement the present disclosure can be stored in computer-readable storage media such as one or more of system memory 1117, fixed disk 1144, optical disk 1142, or floppy disk 1138. Memory 1120 is also used for storing temporary variables or other intermediate information during the execution of instructions by the processor 1110. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
 receiving an indication, wherein
  the indication indicates whether a migration of a first virtual machine (VM) from a first node to a second node was successful,
  the indication is received after receiving a prior indication,
  the first node and the second node are among a plurality of nodes of a cluster of nodes,
  the cluster of nodes are managed by clustering software, and
  the migration is not controlled by the clustering software;
 in response to the receiving the indication, determining whether the indication indicates that the migration was successful; and
 in response to determining that the migration was successful,
  resuming performance of a clustering operation using the first VM, wherein the resuming performance is initiated by the clustering software.

2. The method of claim 1, further comprising:
after the receiving the indication, determining whether the second node detected the first VM being hosted by the second node.

3. The method of claim 2, further comprising:
in response to a determination that the second node has not detected the first VM being hosted by the second node, initiating a status check of the second node, wherein
the status check is configured to detect one or more VMs that are being hosted by the second node.

4. The method of claim 1, further comprising:
in response to determining that the migration was unsuccessful, performing one or more corrective actions with respect to the first VM.

5. The method of claim 4, further comprising:
determining whether the one or more corrective actions are successful, and
in response to a determination that the one or more corrective actions are successful, resuming performance of the clustering operation using the first VM.

6. The method of claim 4, further comprising:
determining whether the one or more corrective actions are successful, and
in response to a determination that the one or more corrective actions are unsuccessful, initiating execution of an error handler.

7. The method of claim 1, wherein
the first node comprises
at least one application; and
the migration comprises
moving the first VM from a first node to a second node without disconnecting the first node and without disconnecting the at least one application.

8. A system comprising:
one or more processors; and
clustering software configured to
receive an indication, wherein
the indication indicates whether a migration of a first virtual machine (VM) from a first node to a second node was successful,
the indication is received after receiving a prior indication,
the first node and the second node are among a plurality of nodes of a cluster of nodes,
the cluster of nodes are managed by the clustering software, and
the migration is not controlled by the clustering software;
in response to a receipt of the indication, determine whether the indication indicates that the migration was successful; and
in response to a determination that the migration was successful, resume performance of a clustering operation using the first VM, wherein resuming the performance is initiated by the clustering software.

9. The system of claim 8, wherein the clustering software is further configured to:
make a determination whether the second node detected the first VM being hosted by the second node, wherein
the determination is made after the receipt of the indication.

10. The system of claim 9, wherein the clustering software is further configured to:
initiate a status check of the second node, wherein
the status check is initiated in response to a determination that the second node has not detected the first VM being hosted by the second node, and
the status check is configured to detect one or more VMs that are being hosted by the second node.

11. The system of claim 8, wherein the clustering software is further configured to:
perform one or more corrective actions with respect to the first VM, wherein
the one or more corrective actions are performed in response to determining that the migration was unsuccessful.

12. The system of claim 11, wherein the clustering software is further configured to:
determine whether the one or more corrective actions are successful, and
in response to a determination that the one or more corrective actions are successful, resume performance of the clustering operation using the first VM.

13. The system of claim 11, wherein the clustering software is further configured to:
determine whether the one or more corrective actions are successful, and
in response to a determination that the one or more corrective actions are unsuccessful, initiate execution of an error handler.

14. The system of claim 8, wherein:
the first node comprises
at least one application; and
the migration comprises
moving the first VM from a first node to a second node without disconnecting the first node and without disconnecting the at least one application.

15. A computer program product comprising:
a plurality of instructions, comprising
a first set of instructions, executable on a computer system, configured to receive an indication, wherein
the indication indicates whether a migration of a first virtual machine (VM) from a first node to a second node was successful,
the indication is received after receiving a prior indication,
the first node and the second node are among a plurality of nodes of a cluster of nodes,
the cluster of nodes are managed by clustering software, and
the migration is not controlled by the clustering software;
a second set of instructions, executable on the computer system, configured to determine whether the indication indicates that the migration was successful, wherein
the second set of instructions are configured to be executed in response to a receipt of the indication;
a third set of instructions, executable on the computer system, configured to resume performance of a clustering operation using the first VM, wherein
the third set of instructions are configured to be executed in response to a determination that the migration was successful, and
resuming the performance is initiated by the clustering software; and a non-transitory computer-readable storage medium, wherein the instructions are encoded in the non-transitory computer-readable storage medium.

16. The computer program product of claim 15, further comprising:
a fourth set of instructions, executable on the computer system, configured to
make a determination whether the second node detected the first VM being hosted by the second node, wherein
the determination is made after the receipt of the indication.

17. The computer program product of claim 16, further comprising:
a fifth set of instructions, executable on the computer system, configured to initiate a status check of the second node, wherein
the status check is initiated in response to a determination that the second node has not detected the first VM being hosted by the second node, and
the status check is configured to detect one or more VMs that are being hosted by the second node.

18. The computer program product of claim 15, further comprising:
a sixth set of instructions, executable on the computer system, configured to perform one or more corrective actions with respect to the first VM, wherein
the one or more corrective actions are performed in response to determining that the migration was unsuccessful.

19. The computer program product of claim 18, further comprising:
a seventh set of instructions, executable on the computer system, configured to determine whether the one or more corrective actions are successful, and
in response to a determination that the one or more corrective actions are successful, resume performance of the clustering operation using the first VM.

20. The computer program product of claim 18, further comprising:
a eighth set of instructions, executable on the computer system, configured to determine whether the one or more corrective actions are successful, and
in response to a determination that the one or more corrective actions are unsuccessful, initiate execution of an error handler.

\* \* \* \* \*